(12) United States Patent
Seong et al.

(10) Patent No.: US 8,819,588 B2
(45) Date of Patent: Aug. 26, 2014

(54) DISPLAY APPARATUS AND METHOD OF DISPLAYING USER INTERFACE THEREOF

(75) Inventors: Hye-young Seong, Suwon-si (KR); Hee-jeong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 12/484,513

(22) Filed: Jun. 15, 2009

(65) Prior Publication Data

US 2010/0146440 A1  Jun. 10, 2010

(30) Foreign Application Priority Data

Dec. 5, 2008  (KR) .......................... 10-2008-0123405

(51) Int. Cl.
*G06F 3/048*  (2013.01)

(52) U.S. Cl.
USPC .......................................................... 715/811

(58) Field of Classification Search
USPC ........................................ 715/764, 810, 811
See application file for complete search history.

(56) References Cited

U.S. PATENT DOCUMENTS

| | | | | |
|---|---|---|---|---|
| 5,497,454 A | * | 3/1996 | Bates et al. | 715/799 |
| 5,548,692 A | * | 8/1996 | Cok | 715/815 |
| 6,115,025 A | * | 9/2000 | Buxton et al. | 345/659 |
| 6,317,739 B1 | * | 11/2001 | Hirata et al. | 1/1 |
| 6,486,898 B1 | * | 11/2002 | Martino et al. | 715/853 |
| 6,583,800 B1 | * | 6/2003 | Ridgley et al. | 715/854 |
| 6,609,062 B2 | * | 8/2003 | Hancock | 701/532 |
| 6,670,971 B1 | * | 12/2003 | Oral | 715/769 |
| 6,724,403 B1 | * | 4/2004 | Santoro et al. | 715/765 |
| 6,738,973 B1 | * | 5/2004 | Rekimoto | 718/104 |
| 6,846,066 B2 | * | 1/2005 | Teshikawara et al. | 347/40 |
| 7,164,410 B2 | * | 1/2007 | Kupka | 345/156 |
| 7,328,174 B2 | * | 2/2008 | Baratz | 705/26.81 |
| 7,395,514 B2 | * | 7/2008 | Stern | 715/854 |
| 7,603,182 B2 | * | 10/2009 | Sano et al. | 700/15 |
| 7,730,422 B2 | * | 6/2010 | Russo | 715/815 |
| 7,840,979 B2 | * | 11/2010 | Poling et al. | 725/41 |
| 8,180,672 B2 | * | 5/2012 | Curtis et al. | 705/14.4 |
| 8,326,530 B2 | * | 12/2012 | Asai et al. | 701/438 |
| 2003/0052912 A1 | * | 3/2003 | Bowman et al. | 345/738 |
| 2007/0011702 A1 | * | 1/2007 | Vaysman | 725/45 |
| 2007/0247642 A1 | * | 10/2007 | Nakamura et al. | 358/1.1 |
| 2008/0014982 A1 | * | 1/2008 | Foxenland | 455/550.1 |
| 2009/0019348 A1 | * | 1/2009 | King | 715/205 |
| 2009/0158167 A1 | * | 6/2009 | Wang et al. | 715/745 |

\* cited by examiner

*Primary Examiner* — Phenuel Salomon
(74) *Attorney, Agent, or Firm* — Sughrue Mion, PLLC

(57) ABSTRACT

Disclosed are a display apparatus which moves a widget on a screen of a TV and a method of displaying a user interface thereof. The method of displaying a user interface including: displaying a grid with irregular intervals on a display unit; and displaying an icon on the display unit to correspond to the displayed grid. With this, a widget is capable of moving corresponding to a grid displayed on a screen of a TV.

7 Claims, 4 Drawing Sheets

DISPLAY APPARATUS AND METHOD OF DISPLAYING USER INTERFACE THEREOF

CROSS-REFERENCE TO RELATED APPLICATION

This application claims priority from Korean Patent Application No. 10-2008-0123405, filed on Dec. 5, 2008 in the Korean Intellectual Property Office, the disclosure of which is incorporated herein by reference.

BACKGROUND OF INVENTION

1. Field of Invention

Apparatuses and methods consistent with the present invention relate to a display and displaying a user interface, and more particularly to a display apparatus which displays a widget, a kind of a user interface, on a screen and a method of displaying a user interface thereof.

2. Description of the Related Art

As the Internet has been accessible via a display apparatus, e.g., a TV and a mobile phone, users can be provided with a variety of services from contents providers.

Such services can be expressed as icons in a widget mode on the screen of a TV. However, the screen may be partially hidden depending on dispositions of widgets displayed on the screen, so that a user is disturbed in watching TV.

SUMMARY OF THE INVENTION

Accordingly, it is an aspect of the present invention to provide a display apparatus which moves a widget on a screen of a TV and a method of displaying a user interface thereof.

Another aspect of the present invention is to provide a display apparatus which is capable of moving a widget corresponding to a grid displayed on a screen of a TV, and a method of displaying a user interface thereof.

Still another aspect of the present invention is to provide a display apparatus which is capable of moving a widget corresponding to a grid with irregular intervals displayed on a screen of a TV, and a method of displaying a user interface thereof.

The foregoing and/or other aspects of the present invention can be achieved by providing a method of displaying a user interface including: displaying a grid with irregular intervals on a display unit; and displaying an icon on the display unit based on the displayed grid.

The displaying the grid may include displaying at an edge portion of the display unit first grid lines that are more closely spaced together than second grid lines at a center portion of the display unit.

The method further may include determining icon disposition history, wherein the displaying the grid comprises displaying at a region with high icon disposition history, first grid lines that are more closely spaced together than second grid lines at another region with low icon disposition history.

The icon may be formed in a widget mode.

The icon may be positioned based on corresponding to the grid.

The icon may be moved by a direction key of a remote control.

The icon may be moved by a direction signal received from a pointing device.

Another aspect of the present invention may be achieved by providing a display apparatus including: a display unit; a user interface generator which generates user interface information; and a controller which controls the user interface generator to display on the display unit, a grid with irregular intervals and an icon that is displayed based on the grid.

The controller may control the user interface generator to display at an edge portion of the display unit, first grid lines that are more closely spaced together than second grid lines at a center portion of the display unit.

The controller may control the user interface generator to display at a region with high icon disposition history, first grid lines that are more closely spaced together than second grid lines at another region with low icon disposition history.

The user interface generator may generate the icon in a widget mode.

The controller may control the user interface generator to position the icon based on the grid according to an instruction of a user.

The display apparatus may further include an instruction receiver which receives a direction signal from a remote control comprising a direction key, wherein the controller may move the icon based on the direction signal of the direction key of the remote control received at the instruction receiver.

The display apparatus may further include an instruction receiver which receives a direction signal from a pointing device, wherein the controller may move the icon based on the direction signal of the pointing device received at the instruction receiver.

Another aspect of the present invention may be achieved by providing a method of displaying a user interface including: generating a grid comprising a grid line interval, and positioning a displayed icon based on grid points of the grid, the grid points being based on the grid line interval, wherein the grid line interval is set based on a frequency of icon placement.

The grid line interval may be at a region of the grid and the frequency of icon placement is a number of times icons have been positioned at the region.

An amount of the grid line interval may be inversely proportional to the frequency of icon placement.

The grid line interval may be a first grid line interval and the frequency of icon placement is a first frequency of icon placement, the grid further including a second grid line interval based on a second frequency of icon placement, that is greater than the first grid line interval, wherein the first frequency of icon placement is greater than the second frequency of icon placement.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
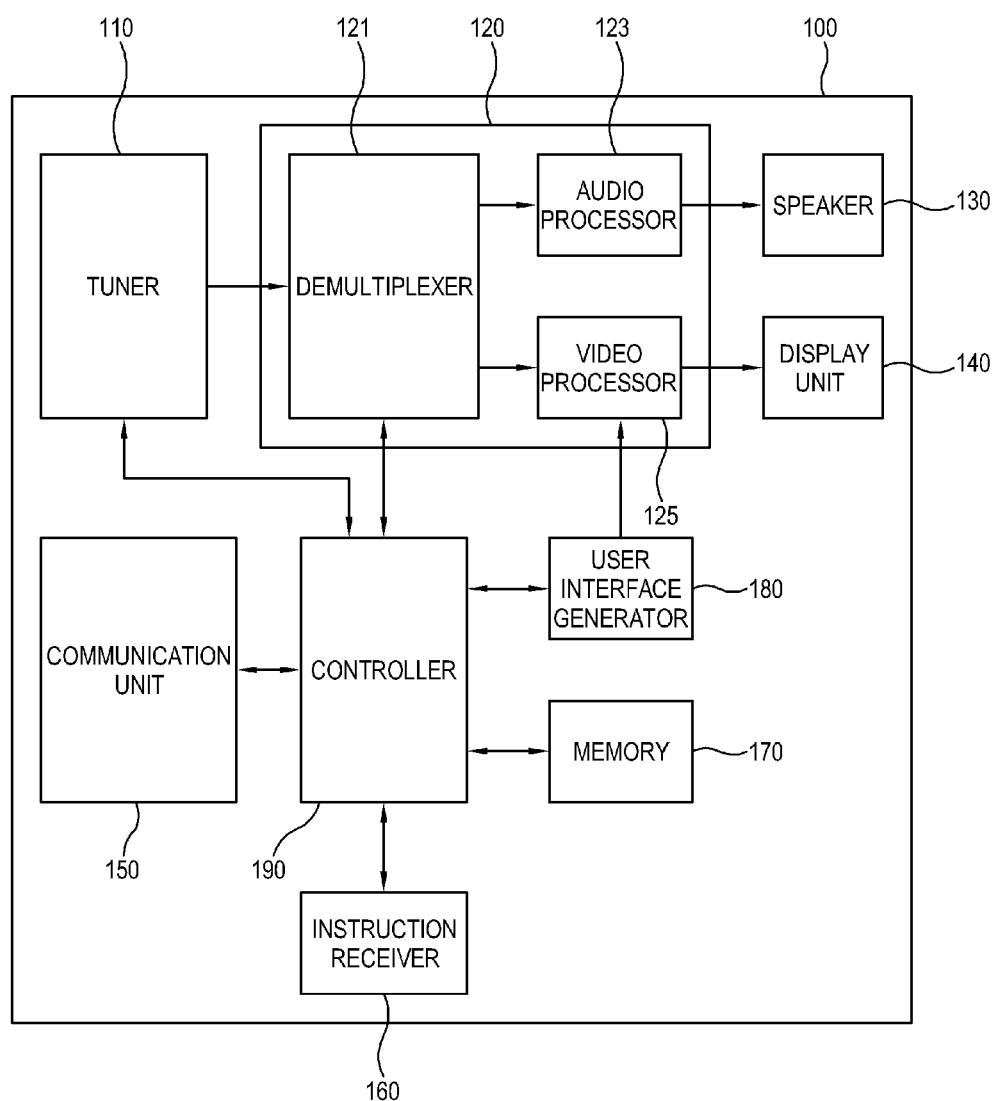
FIG. 1 is a block diagram illustrating a configuration of a display apparatus according to one exemplary embodiment of the present invention.

Below, embodiments of the present invention will be described in detail with reference to accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout.

FIG. 1 is a block diagram schematically illustrating a configuration of a display apparatus according to one exemplary embodiment of the present invention.

Referring to FIG. 1, a display apparatus 100 includes a tuner 110, a signal processor 120, a speaker 130, a display unit 140, a communication unit 150, an instruction receiver 160, a memory 170, a user interface (UI) generator 180, and a controller 190.

The tuner 110 tunes a broadcasting signal having a frequency band corresponding to a channel selected by the controller 190, mentioned later, and demodulates and rectifies it to be output, e.g., into a transport stream (TS) packet.

The signal processor 120 includes a demultiplexer 121, an audio processor 123, and a video processor 125.

The demultiplexer 121 sorts out broadcasting signals modulated by the tuner 110 into various data such as video data, audio data, and Program and System Information Protocol (PSIP) to be output in bit stream.

The audio processor 123 decodes audio data sorted by the demultiplexer 121 and processes them in accordance with output specifications of the speaker 130 to be output.

The video processor 125 decodes video data sorted by the demultiplexer 121 and processes them to have a vertical frequency, a screen resolution, an aspect ratio, etc. in accordance with output specifications of the display unit 140. Further, the video processor 125 scales UI information generated by the UI generator 180, mentioned later, and video data so that the UI information is displayed on the display unit 140 along with the video data.

The speaker 130 amplifies an audio data output from the audio processor 123 into a predetermined-magnitude sound.

The display unit 140 outputs a video data from the video processor 125 and a user interface as images.

The communication unit 150 communicates with a broadcasting server or a web server through the internet to be provided with various services. That is, the communication unit 150 requests a service that a user needs and receives a service transmitted from the outside.

The instruction receiver 160 includes a variety of keys through which a user's instruction is input and may include an infrared receiver which receives a user's instruction transmitted from a remote control (not shown). Instead, the instruction receiver 160 may include a receiver which receives a user's instruction transmitted from a remote control (not shown) such as a pointing device. The remote control transmits a signal in an infrared or radio frequency (RF) format, and the instruction receiver 160 receives a corresponding signal. Meanwhile, the instruction receiver 160 may be combined with the display unit 140 to be realized in a touch panel. A user's instruction input through the instruction receiver 160 is converted into a corresponding key signal to be transmitted to the controller 190.

The memory 170 stores a variety of programs and data required to perform operations of the display apparatus 100. The memory 170 also stores a position of a widget which a user disposes according to a grid displayed on a screen. In addition, the memory 170 stores a history of the position of a widget, which is disposed by the user. Here, it is understood that a region where a widget is frequently disposed has a high history, and a region where a widget is relatively infrequently disposed has a low history.

The UI generator 180 generates a service menu for a user to use a service received through the communication unit 150. Also, the UI generator 180 generates an on-screen display (OSD) menu for a user to set up functions of the display apparatus 100. The UI generator 180 according to the present embodiment generates an icon displaying a received service in a widget mode and a grid where the icon is positioned. Further, the UI generator 180 generates an icon in a widget mode, the icon having been moved by selection of a user or according to a grid in a default mode.

The controller 190 controls the above components to conduct proper functions according to a user's instruction input through the instruction receiver 160. That is, when receiving a user's instruction to request a specific service through the instruction receiver 160, the controller 190 controls the communication unit 150 to request and receive a service which the user needs through the internet. Then, the controller 190 controls the signal processor 120 and the display unit 140 to process the received service and to provide it to the user. Here, the controller 190 may store a position of an icon displayed on the display unit 140, i.e., a position of the icon disposed on a grid and a frequency where an icon is disposed, i.e., a number of times an icon has been disposed at the position or a region, or a number of times icons have been disposed at the position or a region, in the memory 170. In an exemplary embodiment, icon disposition history or the frequency of icon placement, reflect this frequency. A region where an icon is frequently disposed has a high history, and a region where an icon is relatively infrequently disposed has a low history. The controller 190 may control the UI generator 180 to display a grid or merely generate a grid, with grid line intervals based on icon disposition history, e.g., to display a grid with smaller intervals, i.e., more closely spaced grid lines, at a high-history region where an icon has been frequently disposed. For example, depending on a user's preference in positioning an icon on a grid, if an icon is frequently disposed at a left portion or a lower portion, the controller 190 controls the UI generator 180 to display a grid with closer intervals in the left portion or the lower portion. In an exemplary embodiment, the amount of grid line spacing or interval at a region would have an inversely relationship to the level of the frequency of icon placement at that region.

Hereinafter, various examples of a user interface generated by the UI generator 180 will be illustrated.

Figure 2:
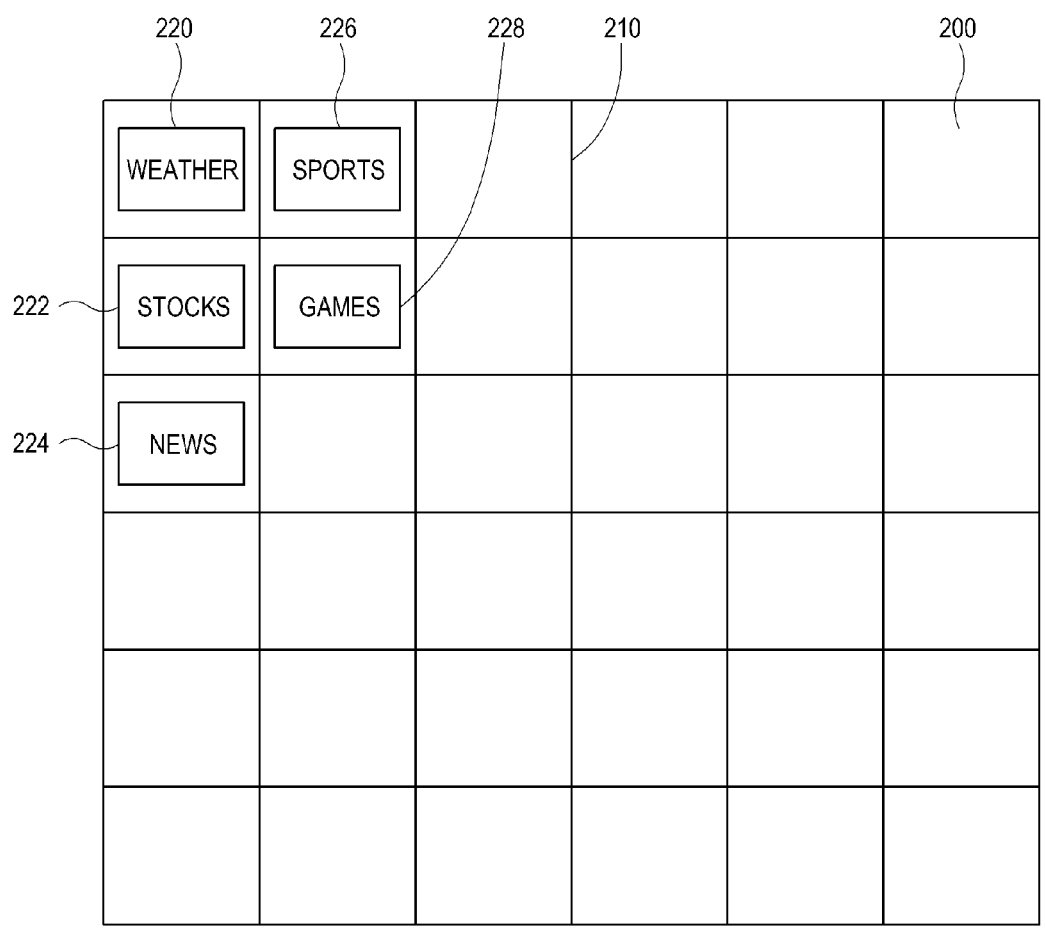
FIGS. 2 and 3 illustrate various user interfaces displayed on the display apparatus according to the exemplary embodiment of the present invention.
Figure 3:
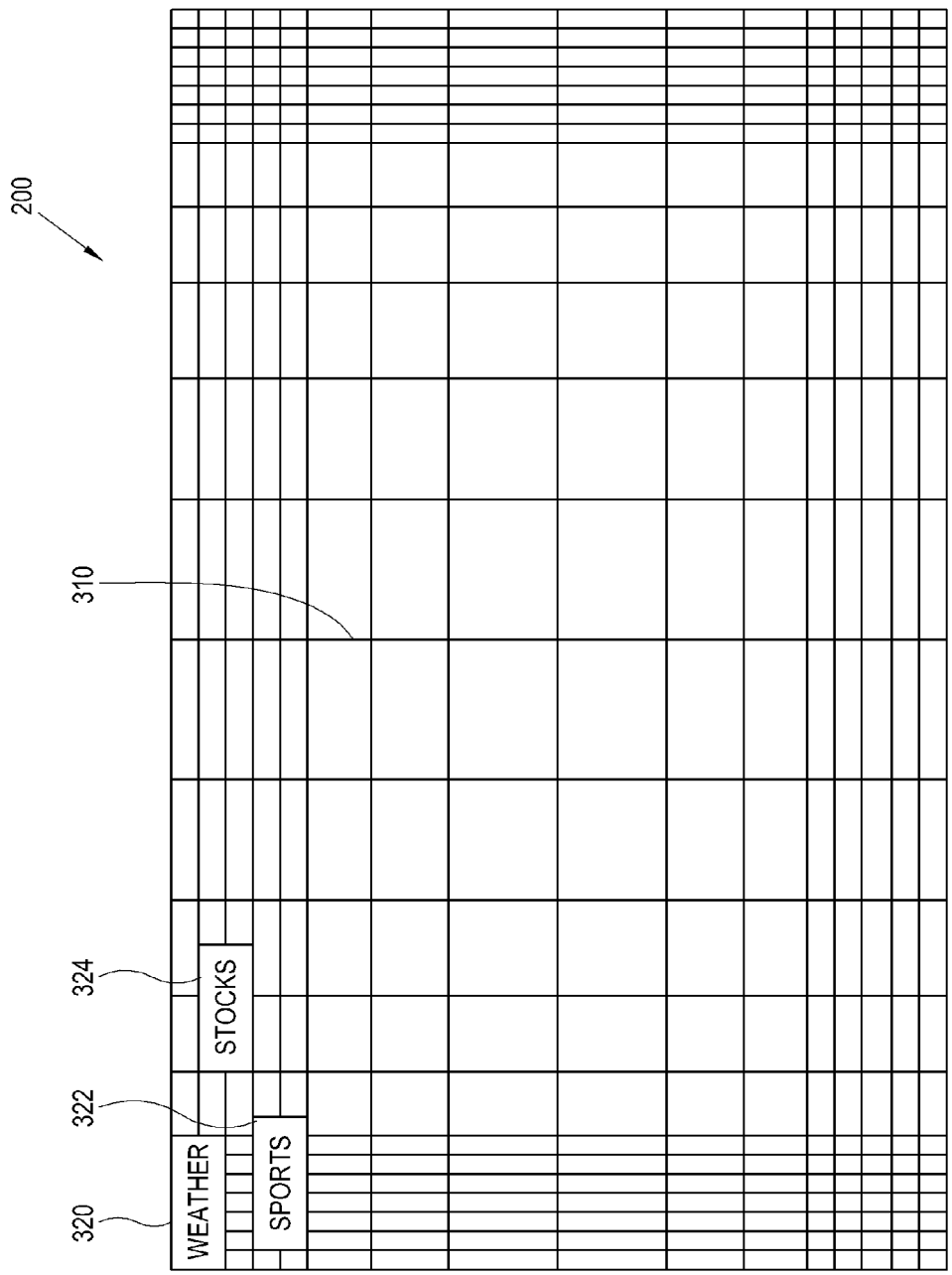

FIGS. 2 and 3 illustrate various user interfaces displayed on the display apparatus according to the exemplary embodiment of the present invention. Referring to FIGS. 2 and 3, the screen 200 displays a broadcasting program and further displays a grid 210 or 310. The screen 200 refers to a portion of the display unit 140 where images are displayed.

The grid 210 of FIG. 2 has a regular interval, i.e., has regularly spaced grid lines. Icons 220, 222, 224, 226, and 228 are displayed based on the grid 210. As the grid 210 has a regular interval, the icons disposed corresponding to the grid 210 are arranged at regular intervals. Here, some of the icons may be disposed close to a center portion of the screen.

The grid 310 of FIG. 3 has irregular intervals. According to one exemplary embodiment with reference to FIG. 3, the grid 310 has closer intervals, i.e., closely spaced grid lines, at left, right, upper and lower portions and less close intervals, i.e., widely spaced grid lines, at a center portion. Icons 320, 322, and 324 are displayed based on the grid 310. The icons of FIG. 3 may have the same size as those of FIG. 2. However, since the grid 310 of FIG. 3 has closer intervals at the left and upper portions, the icons are closely disposed at the left and upper portion. Here, the icons are closely disposed at the left and upper portions, and thus the center portion of the screen 200 is less hidden. Also, when arranging icons, a user adjusts intervals between icons closely at a region of a grid with denser intervals. Sizes of the icons may be changed variously depending on information they include.

In one exemplary embodiment of the present invention, an irregular grid is formed by default gridding or automatic gridding. Default gridding is a mode of forming a grid in a default manner, e.g., a grid with wider intervals at a center portion of the screen 200 and with narrower intervals at an edge portion thereof to minimally disturb the viewing of the screen of a TV.

Automatic gridding is a mode of automatically forming a grid according to a user's widget disposition history. If a user tends to dispose widgets at a left upper region of a screen, a grid has closer intervals at the left upper region than at other regions. To realize automatic gridding, the controller 190 of the display apparatus 100 stores a user's widget disposition history in the memory 170 and determines a position in which the user frequently disposes widgets according to the widget disposition history.

Meanwhile, in one illustrative example where a user disposes a widget, first, a "widget move" function is selected. Here, a grid is provided by default gridding or automatic gridding according to a preset mode. The user moves the widget using a remote control, i.e., direction keys of the remote control, e.g., up, down, right, and left buttons. Then, the user may determine a position of the widget corresponding to the grid using an enter key.

The user moves a widget using different keys including up, down, left, and right buttons of a remote control. Here, the instruction receiver 160 receives a direction signal corresponding to a direction key of the remote control. When widgets are moved, intervals therebetween may be changed corresponding to intervals of the grid.

Furthermore, the user may move a widget using a pointing device (not shown). Here, the instruction receiver 160 of the display apparatus 100 receives a direction signal corresponding to a movement of the pointing device to move the widget. The icons can be moved along the grid displayed on the screen.

As the number of grids and intervals therebetween shown in FIGS. 2 and 3 are illustrative examples, more or fewer grids may be provided. In the FIGs, the icons are disposed in the grids, but may be positioned at intersection portions of the grids, i.e., at grid points.

Figure 4:
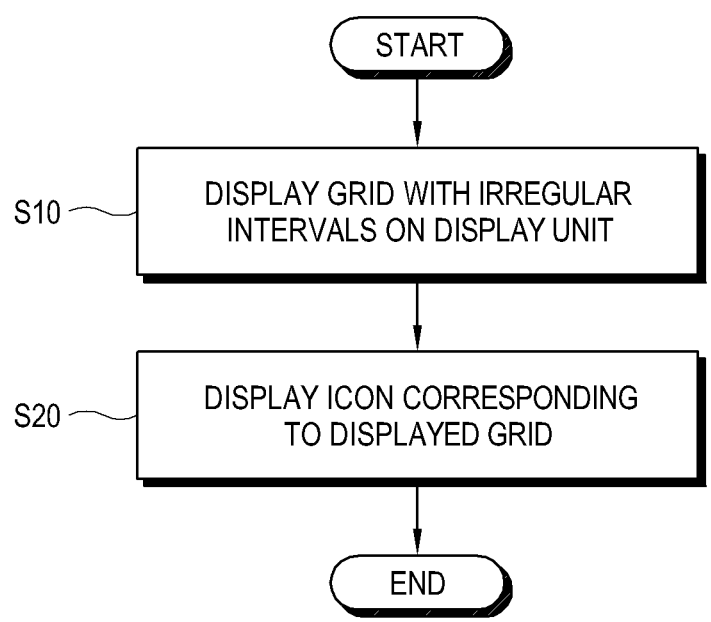
FIG. 4 is a flow chart illustrating a method of displaying a user interface on the display apparatus according to the exemplary embodiment of the present invention.

FIG. 4 is a flow chart to illustrate a method of displaying a user interface on the display apparatus according to the exemplary embodiment of the present invention.

Referring to FIG. 4, the method of displaying the user interface according to the exemplary embodiment of the present invention includes displaying an irregular grid on the display unit 140 of the display apparatus 100 (S10).

Then, the controller 190 controls the display unit 140 to display a grid with closer intervals at an edge portion than at a center portion thereof. The grid may have closer intervals at a region where icons have been frequently disposed according to a user's icon disposition history. The icons may be generated in a widget mode. The icons may be movable corresponding to a displayed grid. Here, the icons are moved by direction keys of a remote control or according to a direction signal received a pointing device.

As described above, in disposing icons on a grid displayed on a screen, the icons are disposed at irregular intervals, so that a center portion of the screen viewed by a user, is less hidden, less cluttered with icons, or less covered with icons. Accordingly, the user is less disturbed in watching TV.

According to the exemplary embodiment of the present invention, a grid has closer intervals at a region where icons are frequently disposed and wider intervals at a region where icons are less disposed, thereby enhancing icon moving and disposition efficiency. Icons can be relatively closely positioned at the high-history region, and they are less closely positioned, i.e., further spaced apart, at a center portion of a screen.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of displaying a user interface, the method comprising:
   determining icon position history,
   generating a grid comprising a grid line interval,
   positioning a displayed icon based on grid points of the grid, the grid points being based on the grid line interval,
   wherein the grid line interval is set based on a frequency of icon placement on a region of the grid, according to a user's selection,
   wherein the intervals of the grid are based on the determined icon position history, and
   wherein the grid line interval is a first grid line interval and the frequency of icon placement is a first frequency of icon placement, the grid further comprising a second grid line interval based on a second frequency of icon placement, that is greater than the first grid line interval, wherein the first frequency of icon placement is greater than the second frequency of icon placement.

2. The method of claim 1, wherein the grid line interval is at the region of the grid and the frequency of icon placement is a number of times icons have been positioned at the region by the user.

3. The method of claim 2, wherein an amount of the grid line interval is inversely proportional to the frequency of icon placement.

4. A display apparatus comprising:
   a display unit;
   a user interface generator which generates user interface information;
   a controller which controls the user interface generator to display on the display unit, a grid with irregular intervals and an icon that is displayed based on the grid,
   wherein the user interface generator generates the icon which is formed as an application,
   wherein the controller controls the user interface generator to position the icon based on the grid, according to an instruction of a user; and
   an instruction receiver which receives a direction signal from a remote control comprising a direction key, wherein the controller moves the icon on the grid based on the direction signal of the direction key of the remote control, received at the instruction receiver, according to the user's instruction,
   wherein the intervals of the grid are based on an icon disposition history,
   wherein the icon disposition history is a history of a frequency of placement of an icon on a region of a grid display by a user and
   wherein the controller controls the user interface generator to display at a region with high icon disposition history, first grid lines that are more closely spaced together than second grid lines at another region with low icon disposition history.

5. The display apparatus according to claim 4, wherein the controller controls the user interface generator to display at an edge portion of the display unit, first grid lines that are more closely spaced together than second grid lines at a center portion of the display unit.

6. A method of displaying a user interface comprising:

determining icon disposition history of a frequency of icon placement on a region of a grid by a user;

displaying the grid with irregular intervals, on a display unit; and displaying an icon on the display unit, based on the displayed grid, wherein the icon is formed as an application, is positioned based on the grid, is moved on the grid by a direction key of a remote control according to a user's selection, wherein the intervals of the grid are based on the determined icon disposition history and wherein the displaying the grid comprises displaying at a region with high icon disposition history, first grid lines that are more closely spaced together than second grid lines at another region with low icon disposition history.

7. The method according to claim 6, wherein the displaying the grid comprises displaying at an edge portion of the display unit, first grid lines that are more closely spaced together than second grid lines at a center portion of the display unit.

\* \* \* \* \*